United States Patent
Zhou et al.

(10) Patent No.: US 12,187,452 B2
(45) Date of Patent: Jan. 7, 2025

(54) HIGH STRENGTH AND ELECTRICALLY CONDUCTIVE NYLON NANOCOMPOSITES FOR FUEL CONVEYANCE SYSTEM

(71) Applicant: Eaton Intelligent Power Ltd., Dublin (IE)

(72) Inventors: Zhou Zhou, Farmington Hills, MI (US); Javed Mapkar, Northville, MI (US)

(73) Assignee: Eaton Intelligent Power Ltd., Dublin (IE)

( * ) Notice: Subject to any disclaimer, the term of this patent is extended or adjusted under 35 U.S.C. 154(b) by 936 days.

(21) Appl. No.: 17/150,036

(22) Filed: Jan. 15, 2021

(65) Prior Publication Data

US 2021/0221528 A1   Jul. 22, 2021

Related U.S. Application Data

(60) Provisional application No. 62/962,059, filed on Jan. 16, 2020.

(51) Int. Cl.
| | |
|---|---|
| *B32B 9/00* | (2006.01) |
| *B29C 48/00* | (2019.01) |
| *B29C 48/09* | (2019.01) |
| *B64D 37/14* | (2006.01) |
| *C08K 3/04* | (2006.01) |
| *C08K 3/36* | (2006.01) |
| *C08L 77/02* | (2006.01) |
| *C08L 83/06* | (2006.01) |
| *B29L 23/00* | (2006.01) |
| *B82Y 30/00* | (2011.01) |
| *B82Y 40/00* | (2011.01) |

(52) U.S. Cl.
CPC ............ *B64D 37/14* (2013.01); *B29C 48/022* (2019.02); *B29C 48/09* (2019.02); *C08K 3/041* (2017.05); *C08K 3/36* (2013.01); *C08L 77/02* (2013.01); *C08L 83/06* (2013.01); *B29L 2023/22* (2013.01); *B82Y 30/00* (2013.01); *B82Y 40/00* (2013.01)

(58) Field of Classification Search
USPC .......................................................... 428/408
See application file for complete search history.

(56) References Cited

U.S. PATENT DOCUMENTS 10,435,539 B2   10/2019   Mapkar et al.

FOREIGN PATENT DOCUMENTS

| CN | 101870812 A | | 10/2010 |
|---|---|---|---|
| CN | 101407632 B | | 1/2011 |
| CN | 102532867 A | | 7/2012 |
| CN | 110894356 | * | 3/2020 |
| CN | 108117743 B | | 2/2021 |

* cited by examiner

*Primary Examiner* — Daniel H Miller
(74) *Attorney, Agent, or Firm* — Merchant & Gould, P.C.

(57) ABSTRACT

A composition including 85.00-99.00 wt. % of a single Nylon polymer; 0.25-5.00 wt. % of conductive nanomaterials; 0.25-5.00 wt. % of a dielectric filler comprising an inorganic, non-conductive, non-platelet nanomaterial selected from alumina nanoparticles, alumina nanotubes, aluminum oxide nanoparticles, silica nanoparticles, boron nitride nanoparticles, boron nanotubes, fumed silica, fumed alumina, and mixtures of one or more of these; and 0.25-5.00 wt. % of a dispersing agent.

21 Claims, 5 Drawing Sheets

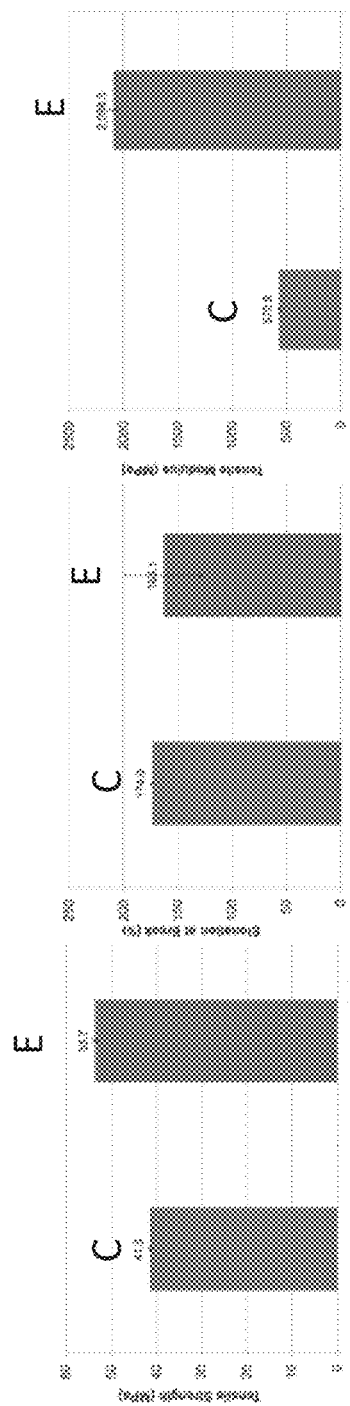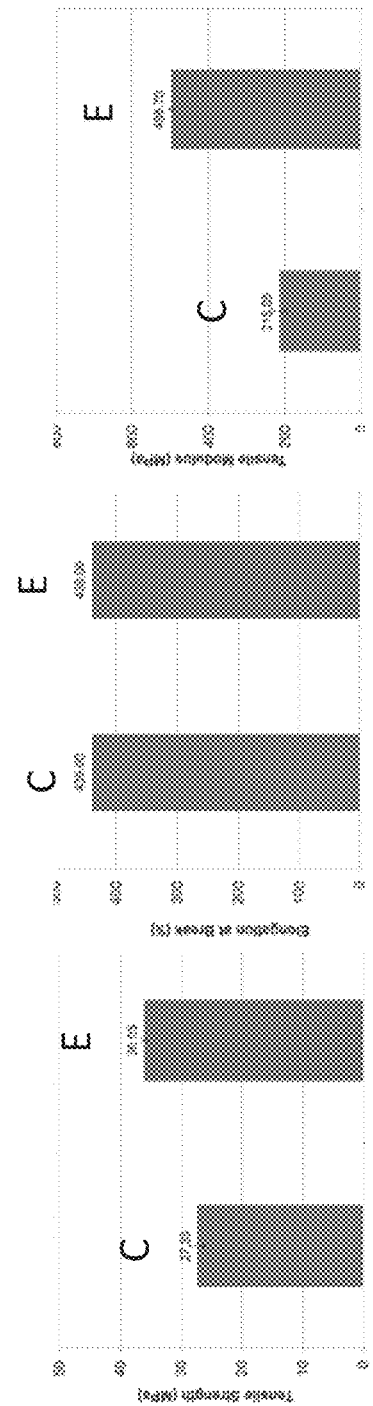

HIGH STRENGTH AND ELECTRICALLY CONDUCTIVE NYLON NANOCOMPOSITES FOR FUEL CONVEYANCE SYSTEM

CROSS-REFERENCE TO RELATED APPLICATION

This application claims priority to U.S. Provisional Application No. 62/962,059, filed Jan. 16, 2020, which is herein incorporated by reference in its entirety.

FIELD OF THE INVENTION

This invention relates to polymer compositions and to processes for the production of polymer compositions. The invention also relates to articles produced from the polymer compositions and to processes for the production of such articles.

BACKGROUND

Composites materials are being increasingly used in airplane structures, components, and systems due to their structural efficiency. There is also an emphasis on the fuel tank safety to minimize the risk of ignition. However, the integration of internal metallic components (especially for components within and passing through fuel tank) and composite structures to ensure the required system safety, particularly regarding electrostatic discharge (ESD) e.g. in the case of a lightning strike, adds design complexity and system level weight. Polymer materials having appropriate ESD properties have been proposed previously. Examples of such polymers typically comprise 10~20% wt conducting additives such as carbon fiber and carbon black, which tends to make the materials brittle. To compensate for this, and to enhance the material processing capability, significant amount of processing additives, plasticizers, and impact modifiers are usually added in the material formulation, which has a negative effect on the polymer properties such as high temperature stability and fluid susceptibility.

CN 101407632 discloses a conductive and antistatic nylon having 60 parts to 98 parts of polyamide resin, 1 part to 15 parts of nano inorganic filling material, 5 parts to 30 parts of conductive carbon black, 0.1 part to 1.0 part of lubricating agent, 0.1 part to 1.0 part of surface processing agent and 0.1 part to 0.5 part of antioxidant.

CN 101870812 discloses a composition for having 80 to 95 percent of nylon 66, 1 to 10 percent of carbon nanotubes, 1 to 15 percent of nanomontmorillonite, 1 to 10.5 percent of compatible toughening agent (maleic anhydride grafted polypropylene), 0.3 to 1 percent of antioxidant (N,N'-(Hexane-1,6-diyl)bis[3-(3,5-di-tert-butyl-4-hydroxyphenyl) propanamide], 0.3 to 1 percent of nucleating agent (talcum powder) and 0.3 to 1 percent of lubricant (Ethylene Acrylic Acid).

CN 108117743 discloses a composition having 80 to 120 parts of nylon, 0.05 to 1 part of a modified carbon nanotube material, 0.5 to 2 parts of a lubricant (calcium stearate) and 1 to 3 parts of a compatilizer (Maleic Anhydride grafted).

CN 102532867 discloses a composition having 50 to 90 parts of matrix nylon, 1 to 5 parts of carbon nanotubes, 0.1 to 0.5 part of antioxidant, 0.1 to 0.5 part of lubricant (AC 540-ethylene acrylic acid copolymer), and 10 to 20 parts of toughening agent (maleic anhydride grafted poly(ethylene-co-1-octene)).

U.S. Ser. No. 10/435,539 discloses a multifunctional composite material that may include a polymer matrix, at least one nano-additive, micro-additive, and/or a spherical nano-additive. The non-metallic composite material may be used to make non-metallic parts for fuel conveyance systems for use in aircraft.

SUMMARY

Aspects of the invention provide compositions, methods, and articles based on polymer compositions having improved, strength, toughness and ESD properties. Embodiments find use in the manufacture of aircraft components such as fuel lines.

A first aspect of the invention is a composition, comprising 85.00-99.00 wt. % of a single Nylon polymer; 0.25-5.00 wt. % of conductive nanomaterials; 0.25-5.00 wt. % of a dielectric filler comprising an inorganic, non-platelet, non-conductive nanomaterial selected from alumina nanoparticles, alumina nanotubes, aluminum oxide nanoparticles, silica nanoparticles, boron nitride nanoparticles, boron nanotubes, fumed silica, fumed alumina, and mixtures of one or more of these; and 0.25-5.00 wt. % of a dispersing agent.

The composition can comprise 0.50-5.00 wt. % of conductive nanomaterials; and 0.10-5.00 wt. % of a dispersing agent.

Examples of the composition can comprise 95.00-99.00 wt. % of a single Nylon polymer; 1.00-2.00 wt. % of conductive nanomaterials; 0.50-1.50 wt. % of dielectric; and 0.50-1.50 wt. % of a dispersing agent.

The single Nylon polymer can be Nylon 12, Trogamid®, Nylon 66, Nylon 4,6 or Nylon 6. For example, composition can comprise at least 90 wt. % of Nylon 12 as the single Nylon polymer. The composition can comprise at least 95 wt. % of the single Nylon polymer.

The conductive nano materials can comprise single-walled carbon nanotubes, multiwall carbon nanotubes, carbon nanostructures, carbon nanofibers, graphene, silver nanoparticles, and copper nanoparticles.

The dielectic filler material are selected on the basis of their effect in ESD or lightning strike test performance, i.e. additives that do not result in sparking or arcing, or the formation of hot spots, or significant drops in resistance. Additives other than those listed may be used provided that they provide these results.

The dispersing agent can comprise polyhedral oligomeric silsesquioxane trisilanols or silanes.

One embodiment of the composition consists of 96.50 wt. % of a Nylon 12 polymer; 1.50 wt. % of carbon nanotubes; 1.00 wt. % of nanosilica; and 1.00 wt. % of polyhedral oligomeric silsesquioxane trisilanol dispersing agent.

A second aspect of the invention is a method of making a composite product according to the first aspect of the invention; the method comprising drying and premixing the single Nylon polymer, the conductive nanomaterials, the dielectric filler, and the dispersing agent; compounding the dried and premixed components; and forming pellets of the compounded composition.

The method can further comprise melting pellets of the compounded composition; and extruding the melted composition through a die to form a shaped article. The shaped article can be a tube A third aspect of the invention is an article, comprising a shaped member formed from a composition according to the first aspect of the invention. The article can be a tube such as a fuel tube for carrying fuel at an elevated pressure. The fuel tube can have an electrical resistance of 100 KΩ/m-2.5 MΩ/m, an operating pressure of 120 psi (0.8 MPa); a burst pressure of 300 psi (2.1 MPa), and an operating temperature of −65-185° F. (−54-85° C.). An example of such a fuel tube can find use in aircraft.

Embodiments of the invention will be apparent in the following description.

BRIEF DESCRIPTION OF THE DRAWINGS

FIGS. 1-3 show the results of comparative coupon tests at 73° F. (22.8° C.) for tensile strength, elongation at break.

FIGS. 4-6 show the results of comparative coupon tests at 180° F. (82.2° C.) for tensile strength, elongation at break.

DETAILED DESCRIPTION

Figure 7:
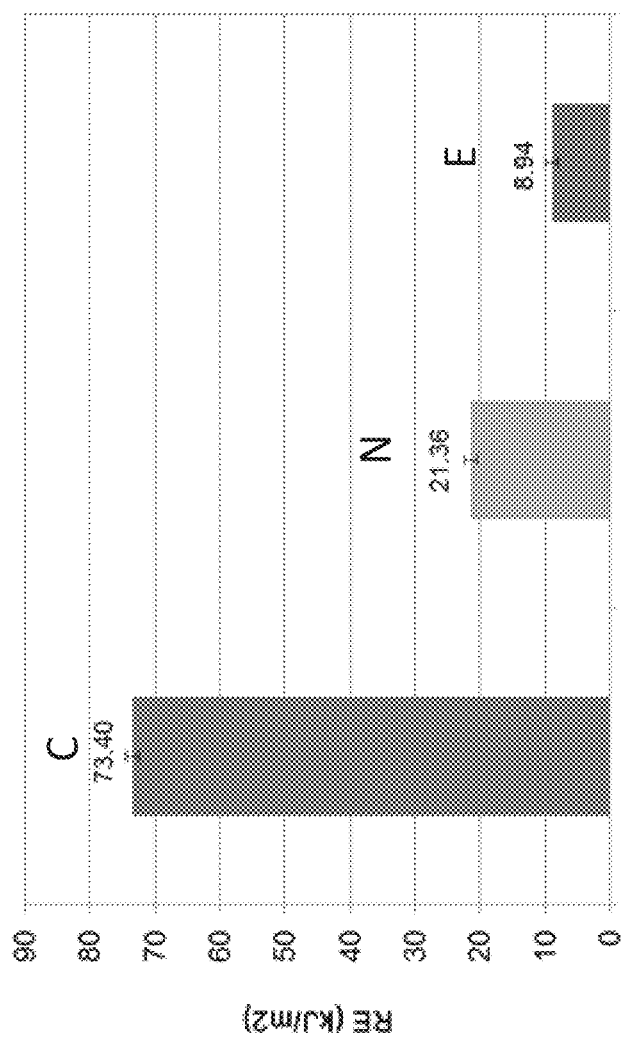
FIG. 7 shows the comparative results for an injection molding tensile bar impact test.

This invention proposes a high strength, electrostatic and lightning compatible polymer nanocomposite solution, embodiments of which can be suitable for replacing metallic fuel tubing of the type currently used in aircraft. Embodiments of these polymer nanocomposites materials can have lower conducting additive content (<5% wt) than has been previously proposed and can achieve high strength and good elongation while maintaining electrical and mechanical properties under long term fluid immersion.

Compositions of the invention are based on a Nylon single polymer system including conductive nanomaterials, a dielectric strength filler and, a dispersing agent.

In the following examples, amounts, such as composition percentages are rounded to the significant figure stated for that amount.

Nylon Polymer

Nylon polymers are considered to be suitable for aircraft fuels systems. They have good mechanical performance, stable chemical properties, are easily processed, and are of low cost.

Suitable polymers have good resistance to aircraft fluids such as jet fuel, phosphate ester hydraulic fluids such as Skydrol®, and cleaning agents routinely used in aircraft applications. The polymers will also have low moisture absorption and be suitable for extrusion and subsequent bending. Nylon 12 and Trogamid® are examples of suitable polymer systems. Other possible Nylon polymers are Nylon 66, Nylon 4,6, and Nylon 6.

Trogamid® (available from Evonik Resource Efficiency GmbH, Essen, Germany) is a polymer system based on a polymer of dimethyl terephthalate and trimethylhexamethylene diamine. Trogamid® T grades have ISO 1043 nomenclature PA 6-3-T and ISO 1874 nomenclature PA NDT/INDT and are based on trimethyl hexamethylene diamine terephthalic acid monomers.

The Nylon polymer system is a single polymer, i.e. it does not comprise a polymer blend. The amount of Nylon polymer is at least 85 wt. %, such as at least 90 wt. %, or at least 95 wt. %. The amount of single polymer can be as high as 99 wt. %.

Conductive Nanomaterials

Conductive nanomaterials are added to the Nylon polymer to provide suitable ESD properties. For example, an extruded fuel pipe for aircraft use may have ab electrical resistance from 100 kΩ/m to 2.5MΩ/m at an applied voltage of 500V DC.

Suitable nanomaterials may be comprised of conductive materials such as single-walled carbon nanotubes, multiwall carbon nanotubes, carbon nanostructures, carbon nanofibers, graphene, silver nanoparticles, and copper nanoparticles.

Carbon nanotubes (CNTs) are used in the specific example given below.

Dielectric Filler

The filler materials are added to enhance the material toughness and strength of the polymer. The materials will be dielectric, i.e. non-conducting, and so will not affect the ESD properties provided by the conductive nanomaterials. Non-platelet type nanomaterials are used as the dielectric filler, such as non-conductive spherical nanofillers such as alumina nanoparticles, alumina nanotubes, aluminum oxide nanoparticles, silica nanoparticles, boron nitride nanoparticles, boron nanotubes, fumed silica, fumed alumina, or combinations thereof for functional improvements. The synergy effect of different materials can further enhance the materials toughness and dielectric strength. Suitable materials can be selected according to performance in lightning strike or ESD tests, i.e. no sparking or arcing, no hot spots, no significant resistance drop.

Dispersing Agent

The dispersing agent is a processing additive such as to Polyhedral Oligomeric Silsesquioxane (POSS) to assist polymer flow during processing and resultant good nanomaterials dispersion. Other suitable dispersing agent include silanes.

In order to test the performance of an example of the invention, a composition consisting of 96.50 wt. % of a Nylon 12 polymer; 1.50 wt. % of carbon nanotubes; 1.00 wt. % of nanosilica; and 1.00 wt. % of polyhedral oligomeric silsesquioxane trisilanol (POSS) dispersing agent is prepared. The polymer and fillers are dried and premixed. The mixture is compounded using a twin-screw extruder to form pellets of the polymer composition. The composition pellets are then melted in a screw extruder and extruded through an appropriate die to form the required test piece (e.g. a tube). Flanges can be formed on a tube by over molding the flange onto the tube.

Mechanical Tests

A series of mechanical tests are conducted on a standard coupon-sized sample of the composition defined above.

FIGS. 1-3 show the results of coupon tests at 73° F. (22.8° C.) for tensile strength, elongation at break, and tensile modulus for a commercial Nylon 12 ESD grade polymer (C) and for the composition defined above (E). FIGS. 4-6 show the corresponding results at 180° F. (82.2° C.

These tests show that the sample (E) is approximately 30% stronger than the commercial sample (C).

FIG. 7 shows the comparative results for an injection molding tensile bar impact test for sample (C) and (E), together with e reference sample of Nylon 12 (N).

Burst Test

In order to demonstrate the burst test capabilities of tubes manufactured from the composition defined above, a standard test sample is prepared comprising a tube 0.5 m long and having an outer diameter of 1.5 inches (3.8 cm) and a wall thickness of approximately 0.097 inches (0.25 cm). The test samples are connected to a supply of pressurized test fluid by epoxy adhesive and O ring seals at each end of the sample. Testing is conducted at room temperature.

The table below summarizes the results of the tests:

| Sample | Burst Pressure (psi/MPa) at room temperature | Result |
|---|---|---|
| 1 | 800/5.5 | Tube Broken |
| 2 | 725/5.0 | |
| 3 | 725/5.0 | |
| 4 | 750/5.2 | Epoxy sealing leaks |
| | Burst Pressure (psi) at 185° F. (85° C.) | |
| 5 | 360/2.5 | Sidewall burst |
| 6 | 390/2.7 | |

A typical aircraft fuel line will have an operating pressure of 120 psi (0.8 MPa); a burst pressure of 300 psi (2.1 MPa), and an operating temperature of −65-185° F. (−54-85° C.).

Impact Test

An impact test will demonstrate the physical properties of the sample by dropping a known weight from a known height onto the test sample (same configuration of tube as above). The results of the test are shown in the table below:

| Sample | Drop | Impact Location Distance from Center (in/cm) | (angle) | Impact Energy Joules | Ft-lbs | Drop Height in/cm | Proof Pressure 200 psi (1379 kPa) |
|---|---|---|---|---|---|---|---|
| 1 | 1 | 0/0 | 0° | 50 | 36.9 | 2.39/6.1 | No |
| 2 | 1 | 0/0 | 0° | 50 | 36.9 | 2.39/6.1 | Leakage |
| | 2 | 1/2.54 | 180° | 100 | 73.8 | 4.79/12.2 | |
| 3 | 1 | 0/0 | 0° | 200 | 147.5 | 9.6/24.4 | Puncture |

The ability of the sample to withstand 100 J impact energy in the test above indicates that the product is likely to be able to withstand impacts typical in a fuel system application of 35 J.

Lightning Strike Tests

A series of electrical tests are performed on pipe samples corresponding to those tested for physical performance. These tests indicate the behavior of the sample under conditions that might be expected in a lightning strike. During the tests, the resistance of the sample is measured, and the sample is observed for sparking, arcing, and hot spots.

1000V Waveform Test

Figure 8:
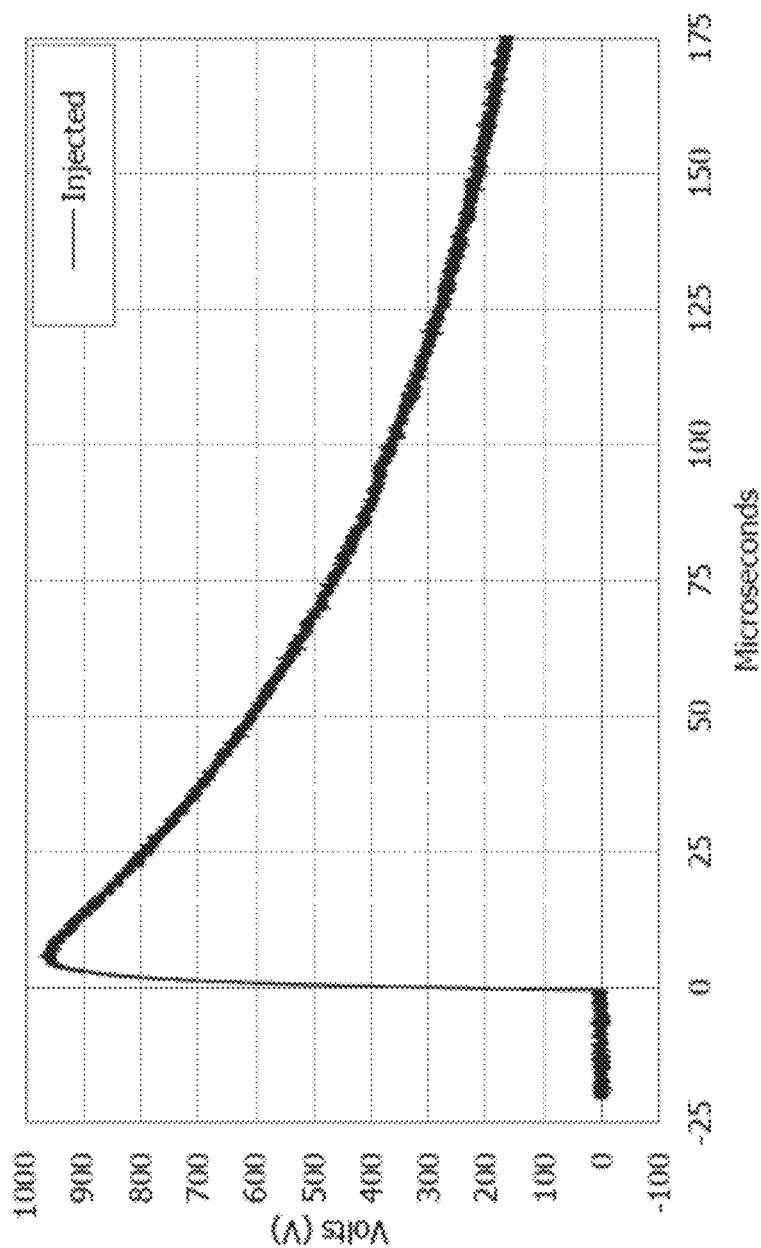
FIG. 8 shows the waveform of voltage applied in an electrical test.

A voltage waveform as shown in FIG. 8 is applied to the sample. Five pulses are applied from each end of the sample. No sparking, arcing, or hot spots are observed. There is no significant change to resistance.

Stepped Voltage Test

A voltage is applied to the test sample and stepped up from 100V/m to 1500V/m. No sparking, arcing, or hot spots are observed. There is no significant change to resistance, resistance dropping 10%-25% after 3 minutes of testing.

Minimum Breakdown Voltage Test

A voltage is applied to the test sample and increased in 500V increments until breakdown (defined as a resistance change of greater than 10 times). There is no significant change to resistance even after 35000V (resistance drop less than 10%-25%).

Immersion Tests

The effects of long-term immersion in common aircraft fluids are tested on samples of pipes and on material test coupons. Pipe samples are tested for change in resistance over time after immersion, and coupons are tested for weight change.

Figure 9:
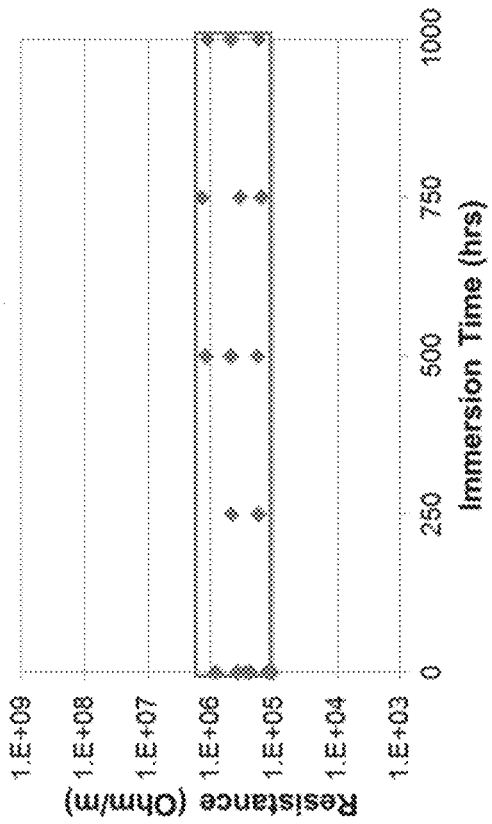
FIGS. 9-12 show the results of comparative sample tests at 55° C. for change in resistance over time after immersion in jet fuel or Skydrol®.
Figure 10:
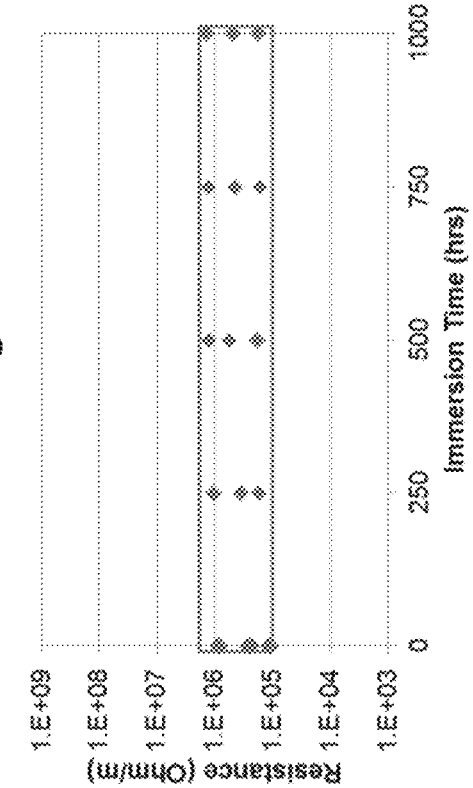
Figure 11:
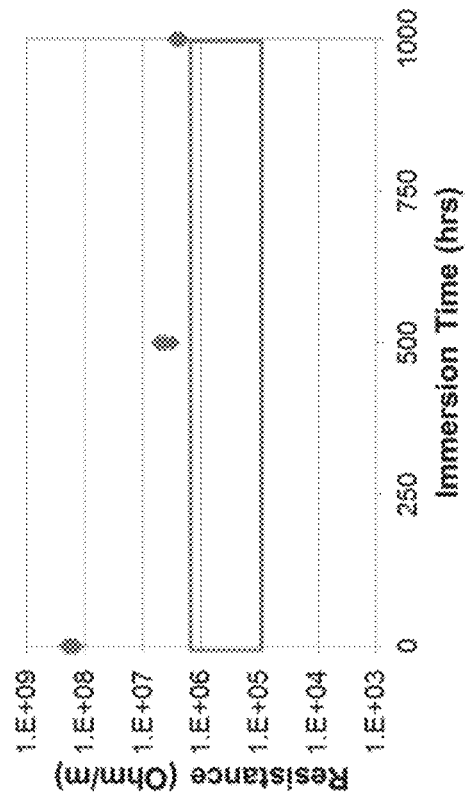
Figure 12:
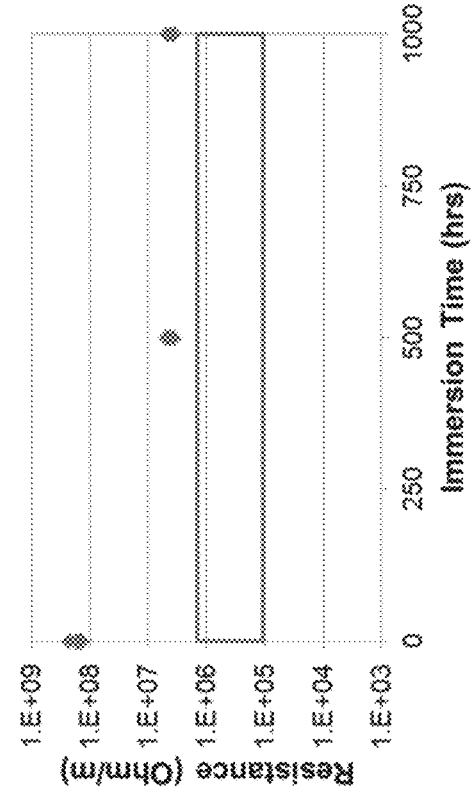

FIGS. 9-12 show the results of the resistance test. In each case, the range of 100 kΩ/m to 2.5MΩ/m is shown as a box in the resistance v. time plots. FIGS. 9 and 10 show results for a current commercial grade nylon pipe that includes carbon black in jet fuel and Skydrol® at 55° C. In both cases, a significant drop in resistance is noted over time. FIGS. 11 and 12 show the corresponding plots for the material composition embodiment discussed above. The resistance changes little over the course of the test and remains within the range of 100 kΩ/m to 2.5MΩ/m.

Figure 15:
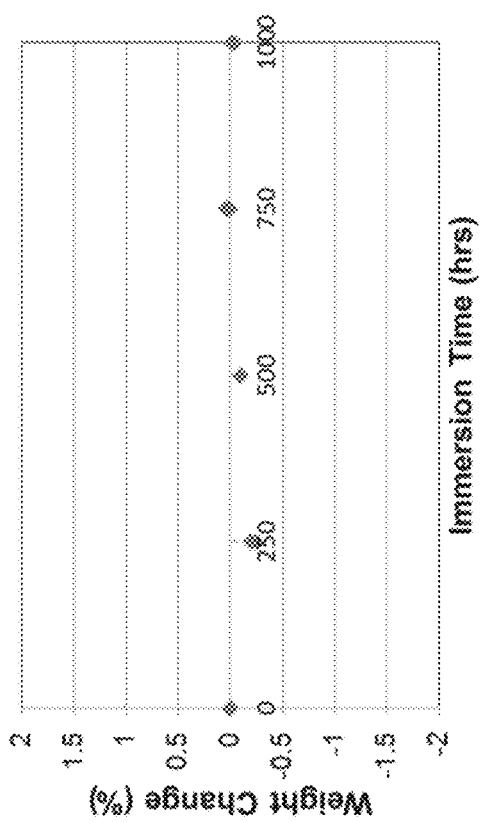
FIGS. 13-16 show the results of comparative coupon tests at 55° C. for change in weight over time after immersion in jet fuel or Skydrol®.
Figure 16:
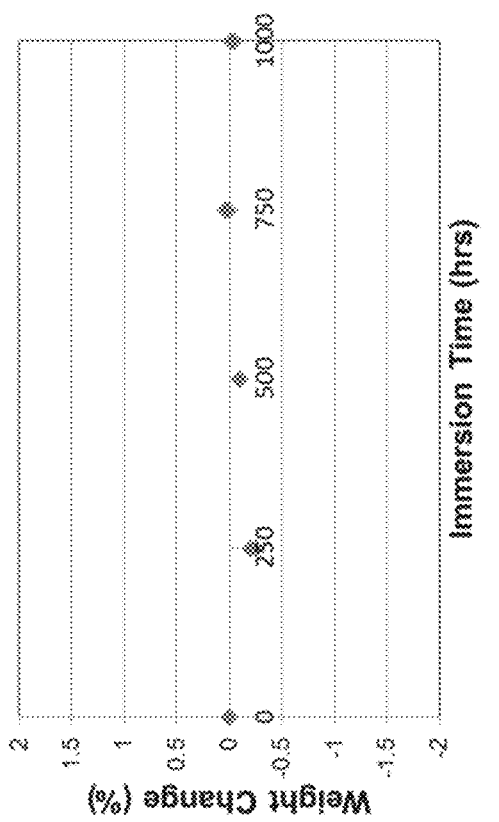
Figure 13:
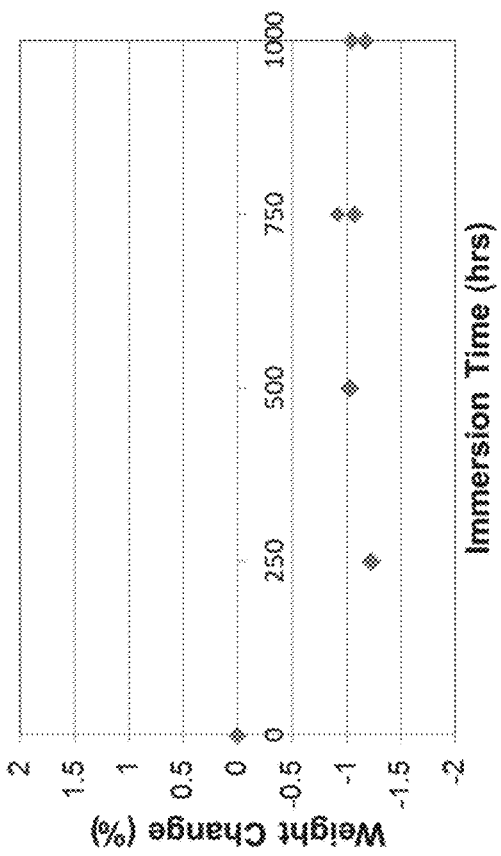
Figure 14:
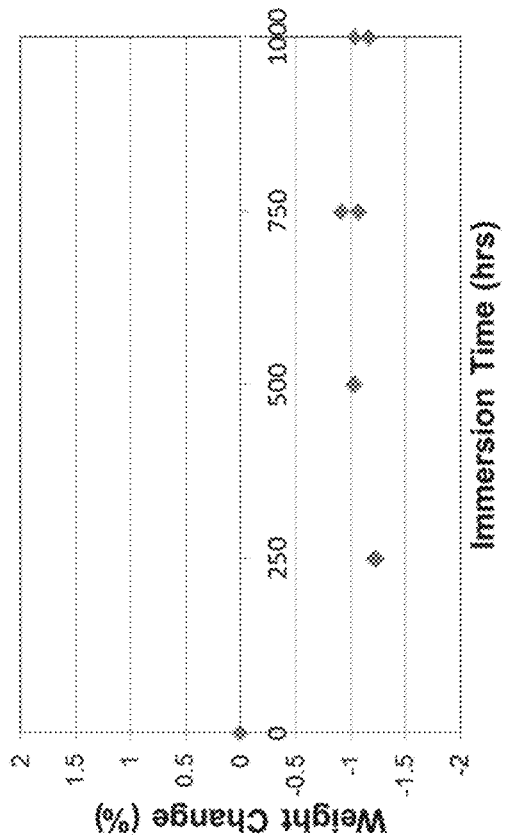

FIGS. 13-16 show the results of coupon weight change tests after immersion for materials corresponding to the samples tested above. FIGS. 13 and 14 show the weight change for the commercial grade Nylon with carbon black after immersion in jet fuel and Skydrol® at 55° C. FIGS. 15 and 16 show the corresponding plots for the material composition embodiment discussed above. FIGS. 13 and 14 show a significant weight loss early in the test. In contrast, the results in FIGS. 15 and 16 show little change in weight for the duration of the test, indicating that the tested embodiment is more stable in these fluids.

No change in tensile properties is detected for both materials.

The exact properties of the materials of the invention can be tailored by varying the composition within the ranges specified.

The invention claimed is:

1. A composition, comprising:
   85.00-99.00 wt. % of a single polyamide polymer;
   0.25-5.00 wt. % of conductive nanomaterials;
   0.25-5.00 wt. % of a dielectric filler comprising an inorganic, non-conductive, non-platelet nanomaterial comprising silica nanoparticles; and
   0.25-5.00 wt. % of a polyhedral oligomeric silsesquioxane trisilanol dispersing agent.

2. A composition as claimed in claim 1, comprising:
   0.50-5.00 wt. % of the conductive nanomaterials; and
   0.5-5.00 wt. % of the dispersing agent.

3. A composition as claimed in claim 1, comprising at least 90 wt. % of polyamide 12 as the single polyamide polymer.

4. A composition as claimed in claim 1, comprising:
   95.00-99.00 wt. % of the single polyamide polymer;
   1.00-2.00 wt. % of the conductive nanomaterials;
   0.50-1.50 wt. % of the dielectric filler; and
   0.50-1.50 wt. % of the dispersing agent.

5. A composition as claimed in claim 1, wherein the single polyamide polymer is polyamide 12, polyamide 6-3-T, polyamide 66, polyamide 4,6, or polyamide 6.

6. A composition as claimed in claim 1, comprising at least 95 wt. % of the single polyamide polymer.

7. A composition as claimed in claim 1, wherein the conductive nano materials are selected from single-walled carbon nanotubes, multiwall carbon nanotubes, carbon nanostructures, carbon nanofibers, graphene, silver nanoparticles, and copper nanoparticles.

8. A composition as claimed in claim 1, wherein the dielectric filler material comprises a spherical nanomaterial.

9. A composition as claimed in claim 1, consisting of:
96.50 wt. % of a polyamide 12 polymer;
1.50 wt. % of carbon nanotubes;
1.00 wt. % of the nanosilica; and
1.00 wt. % of polyhedral oligomeric silsesquioxane trisilanol dispersing agent.

10. A method of making a composite product, comprising:
85.00-99.00 wt. % of a single polyamide;
0.25-5.00 wt. % of conductive nanomaterials;
0.25-5.00 wt. % of a dielectric filler comprising an inorganic, non-conductive, non-platelet nanomaterial comprising silica nanoparticles; and
0.25-5.00 wt. % of a polyhedral oligomeric silsesquioxane trisilanol dispersing agent; the method comprising:
drying and premixing the single polyamide polymer, the conductive nanomaterials, the dielectric filler, and the dispersing agent;
compounding the dried and premixed components; and
forming pellets of the compounded composition.

11. A method as claimed in claim 10, further comprising: melting pellets of the compounded composition; and
extruding the melted composition through a die to form a shaped article.

12. A method as claimed in claim 11, comprising forming a tube as the shaped article.

13. An article, comprising a shaped member formed from a composition comprising:
85.00-99.00 wt. % of a single polyamide polymer;
0.25-5.00 wt. % of conductive nanomaterials;
0.25-5.00 wt. % of a dielectric filler comprising an inorganic, non-conductive, non-platelet nanomaterial comprising silica nanoparticles; and
0.25-5.00 wt. % of a polyhedral oligomeric silsesquioxane trisilanol dispersing agent.

14. An article as claimed in claim 13, wherein the shaped article is a tube.

15. An article as claimed in claim 14, wherein the tube is a fuel tube for carrying fuel and has an operating pressure of at least 120 psi (0.8 MPa); and a burst pressure of at least 300 psi (2.1 MPa) at 85 deg C.

16. An article as claimed in claim 15, wherein the fuel tube has an electrical resistance of 100 KΩ/m-2.5 MΩ/m, and an operating temperature of −65-185° F. (−54-85° C.).

17. The composition of claim 1, wherein the dielectric filler further comprises an inorganic, non-conductive, non-platelet nanomaterial selected from alumina nanoparticles, alumina nanotubes, aluminum oxide nanoparticles, boron nitride nanoparticles, boron nanotubes, fumed silica, fumed alumina, and mixtures thereof.

18. The method of claim 10, wherein the single polyamide is polyamide 12.

19. The article of claim 13, wherein the single polyamide is polyamide 12.

20. The composition of claim 1, wherein the silica nanoparticles comprise fumed silica.

21. The article of claim 13, wherein the silica nanoparticles comprise fumed silica.

* * * * *